US006905966B2

(12) United States Patent
Morita

(10) Patent No.: US 6,905,966 B2
(45) Date of Patent: Jun. 14, 2005

(54) METHOD FOR ESTIMATING REMAINING FILM THICKNESS DISTRIBUTION, METHOD FOR DESIGNING PATTERNING MASK USING THE METHOD FOR ESTIMATING REMAINING FILM THICKNESS DISTRIBUTION, AND METHOD FOR MANUFACTURING SEMICONDUCTOR DEVICES BY USING PATTERNING MASK DESIGNED BY USING THE METHOD FOR ESTIMATING REMAINING FILM THICKNESS DISTRIBUTION

(75) Inventor: Takeshi Morita, Miyagi (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 10/627,734

(22) Filed: Jul. 28, 2003

(65) Prior Publication Data

US 2004/0019871 A1 Jan. 29, 2004

(30) Foreign Application Priority Data

Jul. 29, 2002 (JP) ........................................ 2002-219979

(51) Int. Cl.[7] ...................... H01L 21/302; H01L 21/461
(52) U.S. Cl. .................... 438/692; 438/14; 438/697; 438/945; 451/29; 451/30
(58) Field of Search ........................ 438/692, 14, 697, 438/945, 691, 694, 736, 950, 16, 5, 690, 461; 451/29, 30

(56) References Cited

U.S. PATENT DOCUMENTS 5,948,573 A * 9/1999 Takahashi .................. 430/5
2002/0090745 A1 * 7/2002 Lin et al. .................. 438/14

FOREIGN PATENT DOCUMENTS

JP 2001-313276 11/2001

* cited by examiner

Primary Examiner—Caridad M. Everhart
(74) Attorney, Agent, or Firm—Volentine Francos & Whitt, PLLC

(57) ABSTRACT

A method for estimating relative remaining film thickness distribution (CMP pattern ratio distribution) among sparse and dense active regions after CMP on the basis of the layout of a mask pattern in a one-chip mask region. In each mask pattern, a reduced region is created by removing an area of a predetermined width from the mask pattern along the edge of the mask pattern. Then, the one-chip mask region is segmentalized into predetermined regions to create a plurality of segmentalized regions. On each of the segmentalized regions, the area ratio of all reduced regions occupying a region that includes a segmentalized region at a fixed position and has the same size and shape as those of the foregoing one-chip mask region is acquired. Based on the acquired area ratio, the distribution of remaining film thickness of a surface protection film in the one-chip mask region, i.e., the CMP pattern ratio, is acquired.

9 Claims, 16 Drawing Sheets

FLOWCHART ILLUSTRATING FIRST METHOD FOR ESTIMATING REMAINING FILM THICKNESS

FLOWCHART ILLUSTRATING FIRST METHOD FOR ESTIMATING REMAINING FILM THICKNESS

DIAGRAMS ILLUSTRATING FIRST METHOD FOR ESTIMATING REMAINING FILM THICKNESS

DIAGRAM ILLUSTRATING FIRST METHOD FOR ESTIMATING REMAINING FILM THICKNESS

DIAGRAM ILLUSTRATING FIRST METHOD FOR
ESTIMATING REMAINING FILM THICKNESS

DIAGRAM ILLUSTRATING FIRST METHOD FOR
ESTIMATING REMAINING FILM THICKNESS

ILLUSTRATION OF FIRST METHOD FOR ESTIMATING REMAINING FILM THICKNESS (CMP PATTERN RATIO DISTRIBUTION)

EVALUATION OF VALIDITY OF FIRST METHOD FOR ESTIMATING REMAINING FILM THICKNESS

FLOWCHART ILLUSTRATING SECOND METHOD FOR ESTIMATING REMAINING FILM THICKNESS

FIG. 9
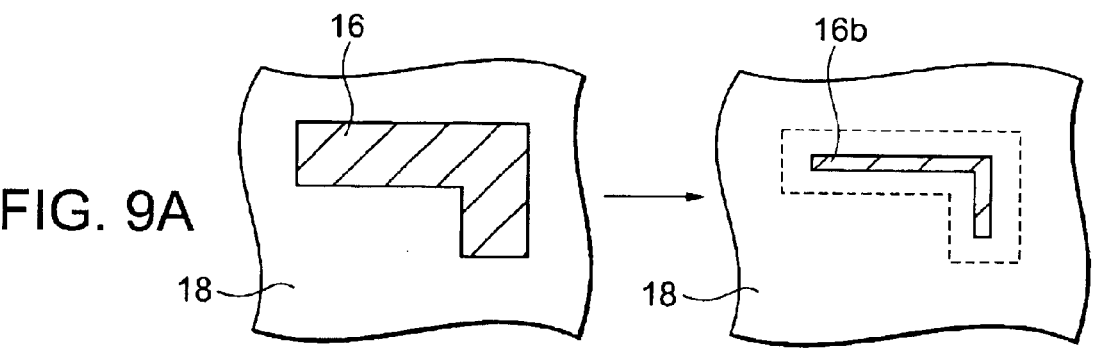
FIG. 9A
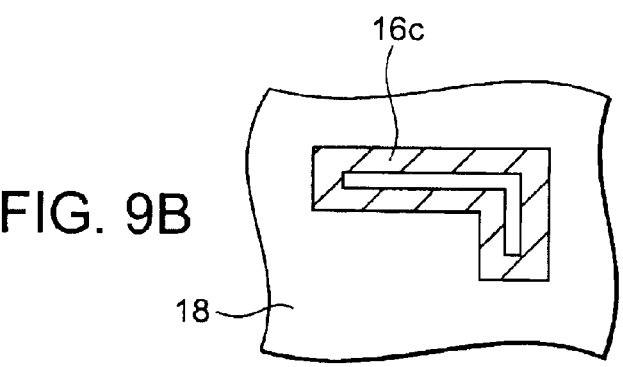
FIG. 9B
DIAGRAMS ILLUSTRATING SECOND METHOD FOR
ESTIMATING REMAINING FILM THICKNESS

DIAGRAMS ILLUSTRATING SECOND METHOD FOR
ESTIMATING REMAINING FILM THICKNESS

ILLUSTRATION OF SECOND METHOD FOR ESTIMATING REMAINING FILM THICKNESS (CMP PATTERN RATIO DISTRIBUTION)

EVALUATION OF VALIDITY OF SECOND METHOD FOR ESTIMATING REMAINING FILM THICKNESS

FIRST PATTERNING MASK DESIGN METHOD

FIRST PATTERNING MASK DESIGN METHOD

SECOND PATTERNING MASK DESIGN METHOD

THIRD PATTERNING MASK DESIGN METHOD

FOURTH PATTERNING MASK DESIGN METHOD

FIFTH PATTERNING MASK DESIGN METHOD

SIXTH PATTERNING MASK DESIGN METHOD

FIG. 20
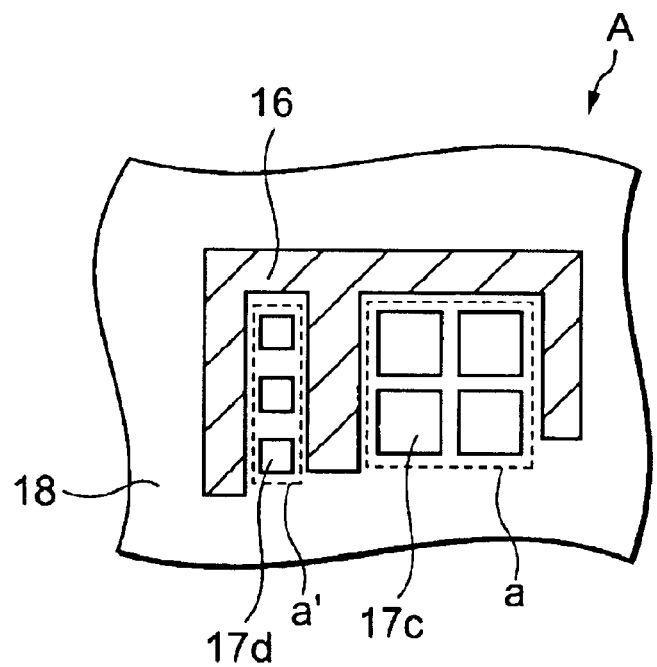
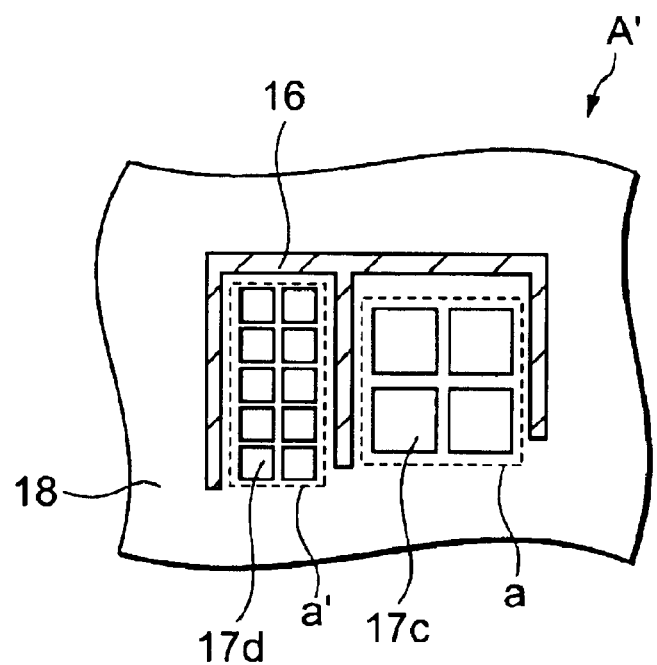
SEVENTH PATTERNING MASK DESIGN METHOD

METHOD FOR ESTIMATING REMAINING FILM THICKNESS DISTRIBUTION, METHOD FOR DESIGNING PATTERNING MASK USING THE METHOD FOR ESTIMATING REMAINING FILM THICKNESS DISTRIBUTION, AND METHOD FOR MANUFACTURING SEMICONDUCTOR DEVICES BY USING PATTERNING MASK DESIGNED BY USING THE METHOD FOR ESTIMATING REMAINING FILM THICKNESS DISTRIBUTION

BACKGROUND OF THE INVENTION

1. Field of the Invention

The present invention relates to a remaining film thickness distribution estimating method for estimating the thickness of film remaining on each activation region (remaining film thickness) after chemical mechanical polishing (CMP) step in, for example, an STI-CMP step, a patterning mask design method using the method for estimating remaining film thickness distribution, and a method for manufacturing semiconductor devices by using a patterning mask designed by the aforesaid patterning mask design method.

2. Description of the Related Art

With the recent increasing trend toward higher integration of semiconductor devices, device isolation technologies for insulatively isolating adjacent semiconductor devices are being extensively used. Among the device isolation technologies, the trench isolation method for insulatively separating semiconductor devices by an insulating film filling a device isolation groove or trench is effective, because it permits reduced separating width to be achieved.

The trench isolation method generally includes an STI-CMP step that stands for shallow trench isolation based on chemical mechanical polishing.

According to the trench isolation method, etching is first carried out by using a patterning mask to form a trench in a semiconductor substrate. At this time, the region excluding the trench provides an activation region (hereinafter referred to also as "active region").

Thereafter, an insulating film is formed over the active region to fill the trench by high density plasma (HDP) chemical vapor deposition (CVD), then CMP is carried out on the semiconductor substrate to form shallow trench isolation portion thereon.

If, however, the semiconductor substrate is etched using the patterning mask to have mixture of an area with sparse active regions formed therein (a sparse active region) and an area with dense active regions formed therein (a dense active region), then a difference in remaining film thickness of the surface protection film remaining on active regions results between the sparse and dense regions after the CMP step. The difference is referred to as "global difference".

The global difference occurs due to the elastic deformation of a polishing pad or abrasive cloth brought in contact with the surface of an insulating film through the intermediary of slurry during the CMP step, the elastic deformation being attributable to an uneven density of the active regions.

In a sparse active region, the polishing pressure applied by the polishing pad to a semiconductor substrate is markedly influenced by the flatness of the surface of the substrate. In a dense active region, the polishing pressure applied by the polishing pad to the semiconductor substrate is scattered by unevenness of the surface. Thus, the difference in polishing pressure takes place between sparse active regions and dense active regions.

As a result, the polishing rate or speed in the dense active regions is slower than the polishing rate in the sparse active regions. Furthermore, the polishing is performed at a time in the CMP step, so that imbalance in remaining film between the sparse and dense active regions, that is, the occurrence of a global difference, is unavoidable.

Especially if the global difference is too large to be ignored, then the active region itself of a sparse active region is cut, whereas an insulating film still remains on the active region of a dense active region when the CMP step is completed. This leads to significantly deteriorated product yield or reliability.

Conventionally, a pseudo active region has been formed on the entire surface of a semiconductor substrate, as necessary, to make adjustment or the like of polishing rate for sparse and dense active regions. It has been, however, difficult to effectively control a global difference.

Thus, there has been demand for a solution that controls the undesirable global difference and permits improved global flatness.

SUMMARY OF THE INVENTION

Accordingly, an object of the present invention is to provide a method for estimating a relative difference in film thickness of remaining film between sparse and dense active regions after a CMP step, a method for designing a patterning mask by using the method for estimating remaining film thickness distribution, and a manufacturing method for a semiconductor device using a patterning mask designed by the aforesaid design method.

To this end, according to the present invention, a semiconductor substrate having a surface protection film is first etched using a patterning mask that has a mask pattern for forming an activation region to form a device isolation trench and an activation region or active region defined by the device isolation trench. Thereafter, an insulating film is provided over the activation region to fill the device isolation trench. At this time, a part of the insulating film on the activation region is removed if the insulating film is provided to fill the device isolation trench and over an activation region whose short side is longer. Then, the semiconductor substrate with the insulating film provided thereon is subjected to chemical mechanical polishing to form a device isolation portion. After the chemical mechanical polishing process, the film thickness distribution of a surface protection film remaining on the activation regions, that is, the distribution of remaining film thickness, is estimated as set forth below.

In each mask pattern, a region of a predetermined width is removed from each mask pattern along an edge of the mask pattern so as to form a reduced region. A one-chip mask region is segmentalized into predetermined regions to generate a plurality of segmentalized regions. On each of these segmentalized regions, an area ratio of all reduced regions occupying a region that includes a segmentalized region at a fixed position and has the same size and shape as those of the foregoing one-chip mask region is acquired. Based on the acquired area ratio, the distribution of remaining film thickness of a surface protection film in the one-chip mask region is acquired.

The method for estimating the distribution of remaining film thickness in accordance with the present invention makes it possible to estimate the relative remaining film thickness distribution (CMP pattern ratio distribution) of remaining film between sparse and dense active regions after CMP according to a layout of a mask pattern in a one-chip mask region, in particular, within a patterning mask.

BRIEF DESCRIPTION OF THE DRAWINGS

FIG. 9 illustrates the second method for estimating remaining film thickness in accordance with the present invention;

FIG. 20 illustrates a seventh method for designing a patterning mask in accordance with the present invention.

DESCRIPTION OF THE PREFERRED EMBODIMENTS

Referring now to FIG. 1 through FIG. 20, embodiments in accordance with the present invention will be explained. The drawings will schematically show configuration examples semiconductor devices in accordance with the present invention. Furthermore, the drawings simply schematically illustrate the shapes, sizes and layout relationships of components to an extent that allows the present invention to be understood, and the present invention should not be deemed to be limited to the illustrated examples. In the following description, particular materials, conditions, etc. will be used in some cases; however, the materials and conditions are merely preferred embodiments, and the present invention is not limited to them.

1. Method for Estimating the Distribution of Remaining Film Thickness 1-1. First Method for Estimating the Distribution of Remaining Film Thickness Referring to FIG. 1 through FIG. 6, a first method for estimating the distribution of remaining film thickness will be described. The distribution of remaining film thickness in accordance with the present invention is presumed using a computer.

First, prior to specific explanation of the method for estimating the distribution of remaining film thickness in accordance with the present invention, an STI-CMP step that actually involves remaining film will be explained with reference to FIG. 2. The patterning process set forth below will use a patterning mask.

A patterning mask usually includes numerous consecutive one-chip mask regions that share the same size and shape or identical to each other and are arranged in a matrix pattern. Moreover, the mask pattern in each one-chip mask region shares the same layout. Hence, the following description will be given mainly of a single one-chip mask region and the mask pattern in the region.

Figure 2A:
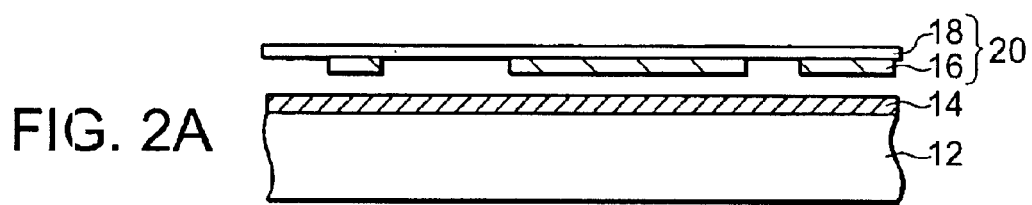
FIG. 2 illustrates the first method for estimating remaining film thickness in accordance with the present invention.
Figure 2B:
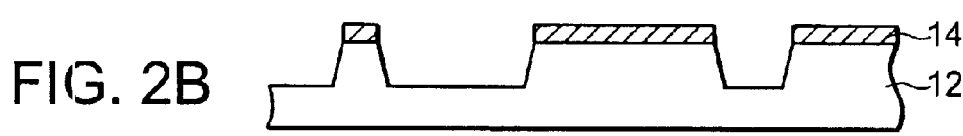

Specifically, as shown in FIG. 2A, patterning is carried out on a semiconductor substrate 12 having a surface protection film 14 made of a silicon nitride (SiN) film or the like by using a patterning mask or photomask 20 having a plurality of mask patterns (referred to also as "pattern regions") 16 individually formed on a mask base 18 for forming activation regions. This creates a remaining activation region or active region 22 and etched device isolation groove or trench 24 (step for forming an STI). The photomask 20 is to be formed of an equi-multiple projection mask. Referring to FIG. 2B, reference numeral 40 denotes a region wherein active regions have been sparsely formed (a sparse active region), while reference numeral 50 denotes a region wherein active regions have been densely formed (a dense active region). As is well known, the patterning mask 20 may be composed of the mask base 18 made of, for example, a glass substrate provided with the mask pattern 16 made of chromium (Cr).

Figure 2C:
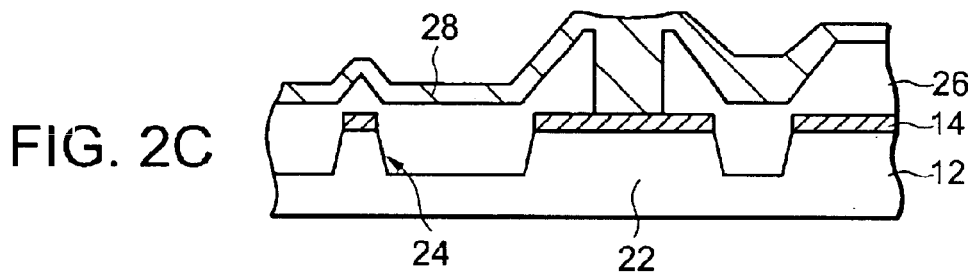

Subsequently, as illustrated in FIG. 2C, an insulating film 26 that will be the film to be polished in the subsequent step, namely, a CMP step, is formed to fill the device isolation trench 24 and to cover all the activation regions 22 (step for forming an insulating film). The insulating film 26 undergoes a chemical mechanical polishing (CMP) step to provide device isolation portions separated from each other. A silicon oxide film ($SiO_2$) or the like is used for the insulating film 26. At this time, the insulating film 26 is convexly deposited on each active region 22. The thickness of the insulating film 26 convexly formed depends on the length or width of the short side of each active region 22. Thereafter, of the active regions 22, a part of the insulating film 26 on the active region 22 having a large short side is removed (step for removing the insulating film). Then, slurry 28 is applied onto the insulating film 26.

Figure 2D:
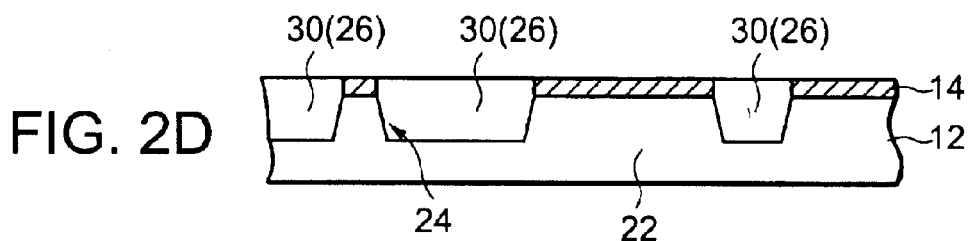

Subsequently, as illustrated in FIG. 2D, CMP is carried out on the semiconductor substrate 12 on which the surface protection film 14 and the insulating film 26 have been formed in sequence to form device isolation portions 30 in the sparse active region 40 and the dense active region 50, respectively (CMP step). More specifically, the CMP is performed by rubbing an abrasive pad (not shown) and the insulating film 26 against each other through the intermediary of the slurry 28 under a predetermined polishing pressure. The CMP is completed when the insulating film 26 on the surface protection film 14 on each active region 22 has been removed to evenly expose the surface protection film 14.

Normally, however, there will be a difference in polishing pressure between the sparse active region 40 and the dense active region 50 in the CMP step, although the difference is reduced by removing a part of the insulating film covering the active region having a short side of a large length among the active regions prior to the CMP step, as described above. The difference in polishing pressure causes the polishing rate or speed in the sparse active region 40 to be higher than the polishing rate in the dense active region 50.

Hence, it would be ideal if the CMP were completed when the surface protection films 14 on all active regions 22 have been exposed. In reality, however, the difference in polishing rate leads to imbalance, that is, a global difference, taking place between the sparse active region 40 and the dense active region 50. The global difference in this case means the difference in film thickness of the surface protection film 14 remaining on the active regions 22 between sparse and dense active regions 40 and 50.

Accordingly, in this configuration example, based on the aforesaid patterning mask layout, a first method for estimating the distribution of remaining film thickness will be explained in detail. In this method, the relative film thickness differences of remaining films between the sparse active region and the dense active region after the CMP step will be estimated.

Figure 1:
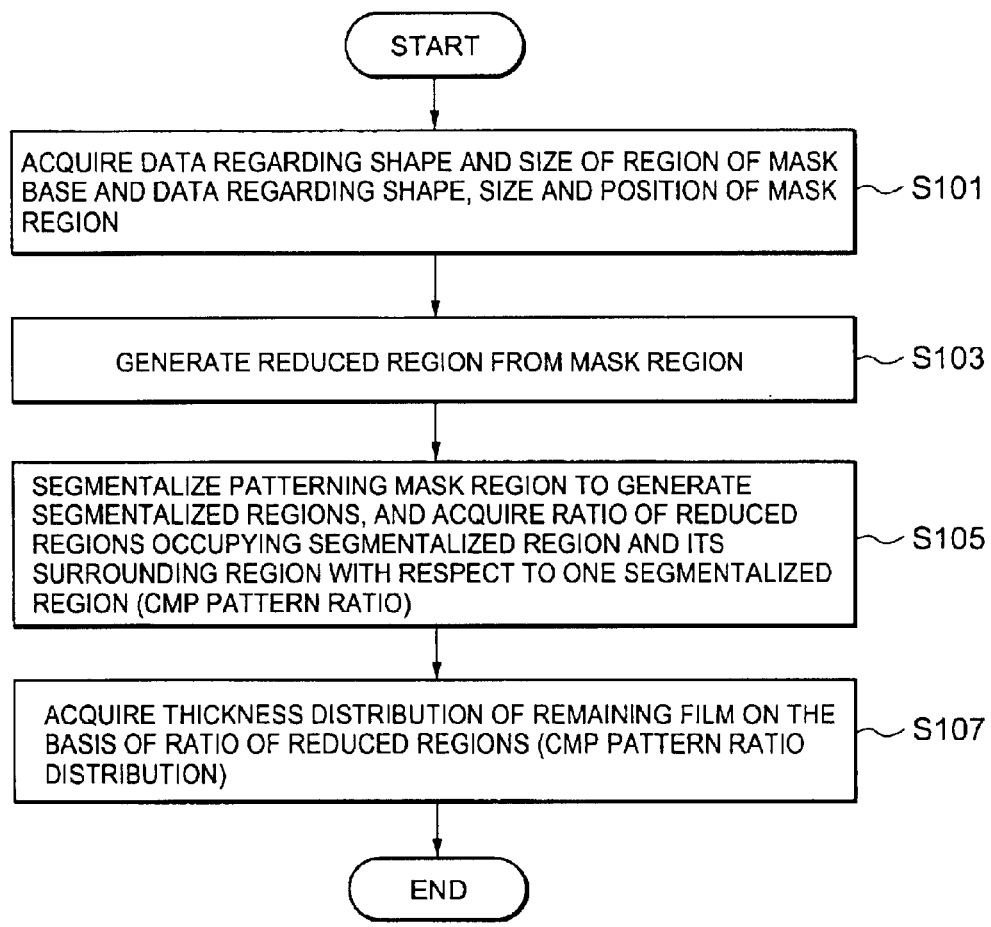
FIG. 1 is a flowchart illustrating a first method for estimating remaining film thickness in accordance with the present invention.

FIG. 1 is a flowchart schematically illustrating the first method for estimating the distribution of remaining film thickness in accordance with the present invention.

First, as shown in FIG. 1, data regarding the shape and size of a region or a one-chip mask region of the mask base 18 and data regarding the shape, size and position of the mask pattern 16 which is provided in the mask base 18 and in which activation regions should be formed are acquired in step S101. These pieces of data can be read from a data file created using, for example, patterning mask designing software (e.g., GDS2). Based on the acquired data, a plurality of types of information necessary for required processing set forth below can be obtained.

Figure 3:
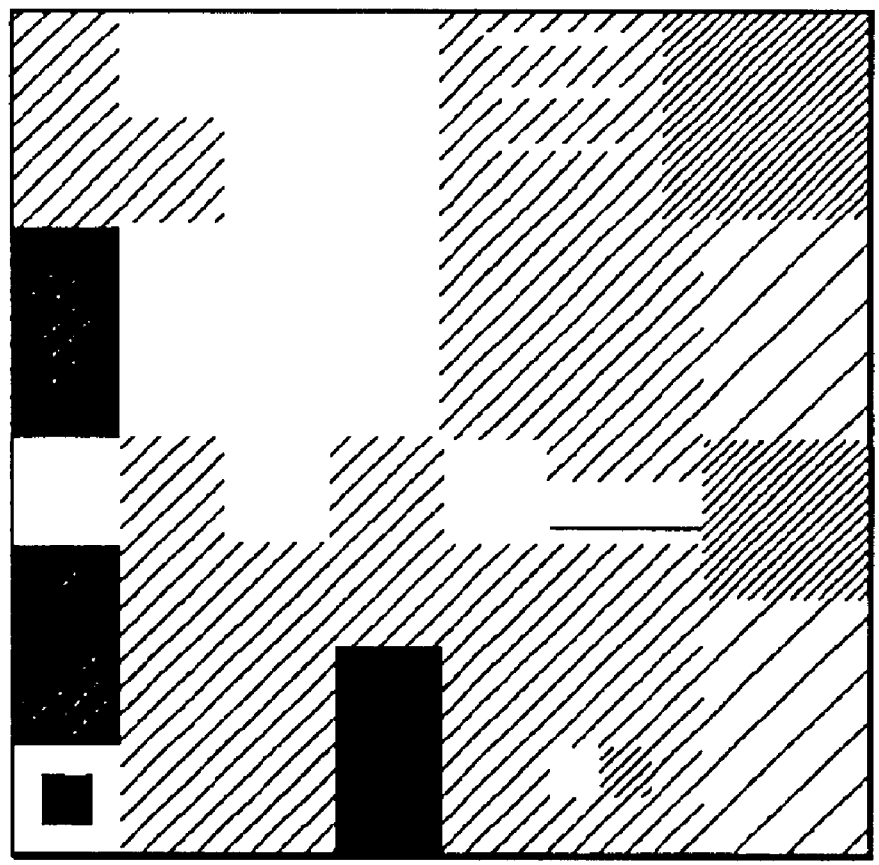
FIG. 3 illustrates the first method for estimating remaining film thickness in accordance with the present invention.

In this configuration example, a patterning mask provided with a mask region for forming an assessment test element group (TEG) chip having active regions distinguished by hatching density shown in FIG. 3 is designed. Referring to FIG. 3, a densely hatched region corresponds to a region with a high mask pattern density in the patterning mask. The size of the assessment TEG chip corresponds to the one-chip semiconductor substrate size, that is, "chip size."

Specifically, in this configuration example, a patterning mask in which the foregoing mask patterns 16 in the one-chip mask region are formed in a matrix pattern such that they have the density shown by the hatching shown in FIG. 3 is designed in the one-chip mask region.

Subsequently, in step S103, a reduced region is generated by removing, from a mask pattern, an area of a predetermined width along the edge of the mask pattern. The reduced region is generated in every mask pattern.

Figure 4A:
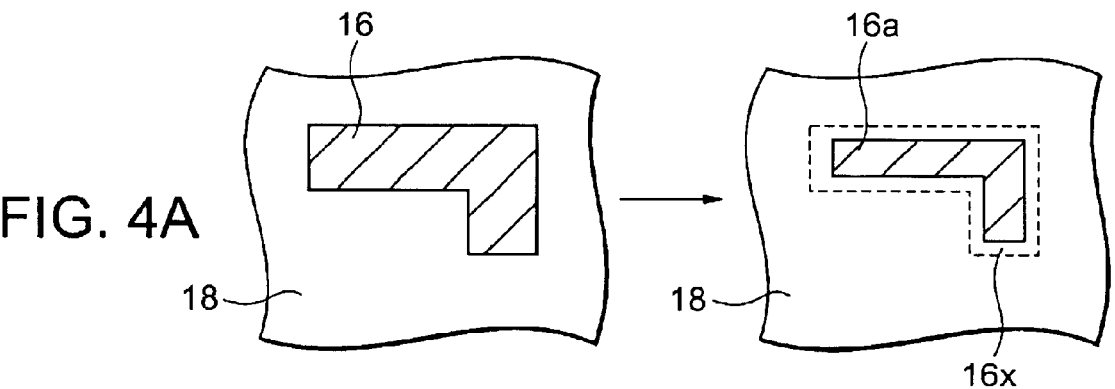
FIG. 4 illustrates the first method for estimating remaining film thickness in accordance with the present invention.

An arbitrary mask pattern 16 set on the patterning mask 20 shown in FIG. 4A will be taken as an example to be described. The area of the predetermined width to be removed will be denoted by 16x.

Normally, when an insulating film is formed on a semiconductor substrate with trenches, the surface of the insulating film will have an irregular surface which is concave at the trenches. Thus, the insulating film covering the activation regions is not deposited with an even thickness; the insulating film is deposited such that it is shaped to be negatively sized inward from the surface of the substrate upward. As a result, the deposited insulating film has a convex shape in which the bottom surface area thereof is larger than the top surface area thereof (see FIG. 2).

Therefore, a reduced region 16a is created to have substantially the same size and shape as those of the top surface area of the insulating film portion covering the activation region formed using the mask pattern 16 corresponding to the reduced region 16a.

The reduced region 16a is defined as a region obtained by subtracting, from the mask pattern 16, an area (corresponding to the aforesaid region 16x to be removed) equivalent to the negative sizing amount (e.g., about 0.02 $\mu$m) of an activation region formed in association with the mask pattern. Preferably, therefore, the mask pattern 16 and the reduced region 16a are similar figures. The aforesaid predetermined width can be known as long as the material and thickness of the insulating film to be formed are known. Hence, the information regarding the material and thickness is entered in a computer, and a predetermined width can be set by storing beforehand the predetermined widths determined by materials and thicknesses in a memory and by reading the information from the memory.

Subsequently, in step S105, a CMP pattern ratio is determined. For this purpose, the patterning mask 20 is first segmentalized into an arbitrary number of regions of the same shape and size to generate a plurality of segmentalized regions of the same shape and size. The segmentalization may be accomplished on a display screen of the computer. In this case, at least the one-chip mask region, which will be the central region, and its peripheral regions, namely, eight one-chip mask regions surrounding the central one-chip mask region may be segmentalized. Alternatively, however, the entire region of the patterning mask may be segmentalized.

The above segmentalization will be briefly explained.

Figure 4B:
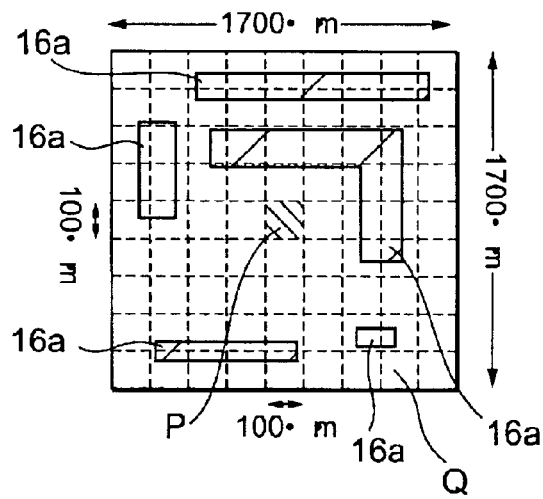

The thickness of the film remaining from CMP is subjected to the influences of the density of surrounding active regions. Hence, in this configuration example, if one unit of segmentalized region is defined as the central region, then a plurality of segmentalized regions surrounding the central region, that is, the peripheral regions, will be considered, Specifically, in this configuration example, as shown in FIG. 4B, the entire one-chip mask region (e.g., 1700 $\mu$m$^2$) of the patterning mask is segmentalized into one unit, e.g., 100 $\mu$m$^2$ quadrate regions. In this case, 17×17 segmentalized regions are generated. FIG. 4B is merely a schematic diagram, and shows 9×9 segmentalized regions for convenience. The one-chip mask regions are arranged in a matrix pattern, and the 17×17 segmentalized regions are also created for the central region and all the eight peripheral one-chip mask regions. The number of segmentalized regions is not limited to 17×17, and may be set to any appropriate values.

Attention will now be paid to a single one-chip mask region, and the CMP pattern ratios on all segmentalized regions in the one-chip mask region will be determined. A certain segmentalized region is denoted as P, and the remaining region of the one-chip mask region excluding region P is denoted as Q. The proportion of the area of the reduced regions 16a occupying in the region combining the 100-$\mu$m$^2$ region P and the surrounding region composed of a plurality of segmentalized region Q in the 1700-$\mu$m$^2$ region disposed to center around the 100-$\mu$m$^2$ region P is obtained.

In this configuration example, it is assumed that, for instance, the 100-$\mu$m$^2$ region P lies at the central position of the one-chip mask region. The entire region formed of the region P and its surrounding region Q coincides with the one-chip mask region. Therefore, the combined area of the region P and its surrounding region Q will be an area $S_M$ of the one-chip mask region.

Then, a total area $S_{TO}$ of all reduced regions 16a corresponding to all mask patterns existing in the one-chip region with the region P established as its center, as shown in FIG. 4B, is determined. Thus, the CMP pattern ratio is determined from $S_{TO}/S_M$.

Figure 5:
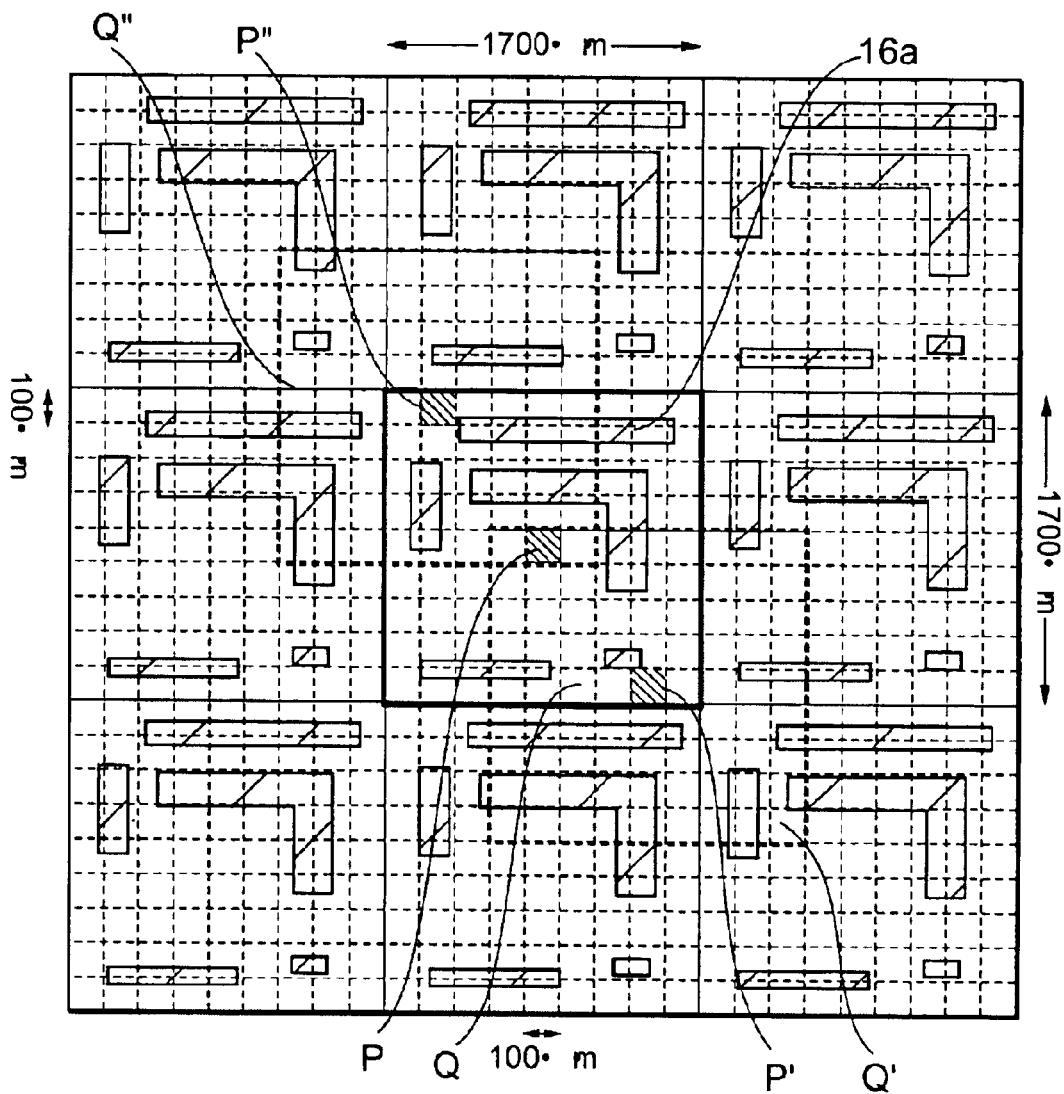
FIG. 5 illustrates the first method for estimating remaining film thickness in accordance with the present invention.

Next, it is assumed that the a segmentalized region is dislocated from a one-chip mask region in interest, as shown in FIG. 5. As explained previously, the one-chip mask region around the one-chip mask region of interest has already been segmentalized in the same manner. In this case, therefore, a new temporary one-chip mask region (defined by the bold dotted line) at a shifted position with a 100-$\mu m^2$ region P' being at its central position is assumed. The temporary one-chip mask region has the same shape and size as those of the one-chip mask region of interest and identical to each other. A total area $S_{T1}$ of all reduced regions 16a corresponding to all mask patterns included in the temporary one-chip mask region is determined. Thus, the CMP pattern ratio can be determined from $S_{T1}/S_M$. Similarly, a new temporary one-chip mask region (defined by the bold dotted line) with a 100-$\mu m^2$ region P" being at its central position is assumed, and a total area $S_{T2}$ of the reduced regions 16a included in the one-chip mask region is determined in the same manner. Thus, the CMP pattern ratio can be determined from $S_{T2}/S_M$.

In this way, on all segmentalized regions, i.e., all units, generated in a one-chip mask region of interest, the proportion of the area occupied by all reduced regions corresponding to the mask patterns, i.e., the CMP pattern ratio, in a temporary one-chip mask region centering around its unit can be determined.

In the configuration example described above, the single segmentalized region of interest has been set at the central position of the temporary one-chip mask region. The segmentalized region of interest, however, does not have to be at the central position; it may be set at a position shifted from the central position of the temporary one-chip mask region. In such a case, however, the position where a segmentalized region of interest in each temporary one-chip mask region is set will be the same or fixed in any one one-chip mask region. In other words, segmentalized regions of interest are not set at different positions from one temporary one-chip mask region to another.

Subsequently, in step S107, based on the area ratio of the reduced regions acquired in step S105, the distribution of remaining film thickness after CMP (known also as "CMP pattern ratio distribution") in percent (%) is acquired. The CMP pattern ratio distribution may be displayed on a display screen of a computer or printed out on paper by a printing device. Alternatively, the distribution may be temporarily stored in a computer memory.

Figure 6:
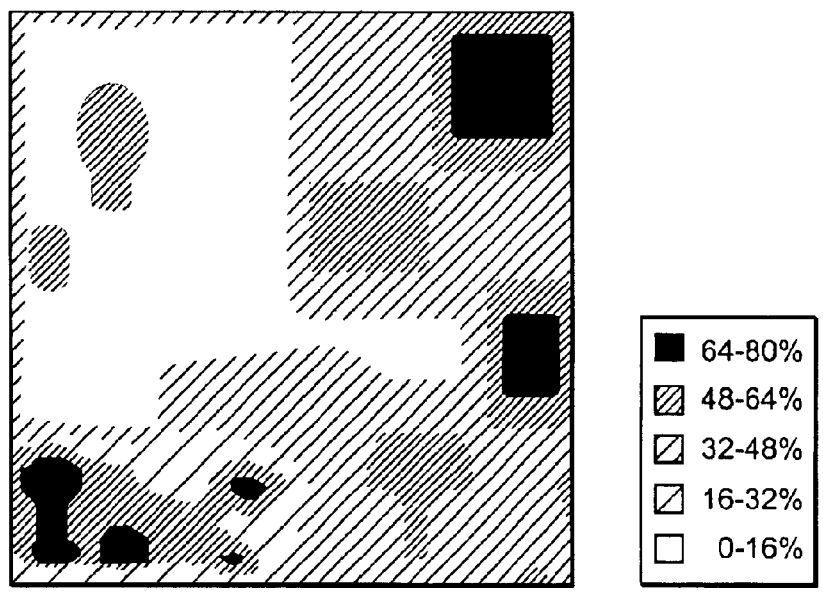
FIG. 6 illustrates the first method for estimating remaining film thickness in accordance with the present invention.

By carrying out the series of steps discussed above, it is possible to obtain the CMP pattern ratio distribution defined by the hatching density, as shown in FIG. 6. In the diagram, a region with denser hatching indicates a region with a higher CMP pattern ratio, meaning that the remaining film is thicker (refer to the densities in percent (%) at right in FIG. 6).

Thus, the relative differences in thickness of remaining film between sparse active regions and dense active regions following the CMP step can be estimated from the CMP pattern ratio distribution obtained on the basis of the layout of a patterning mask.

Figure 7:
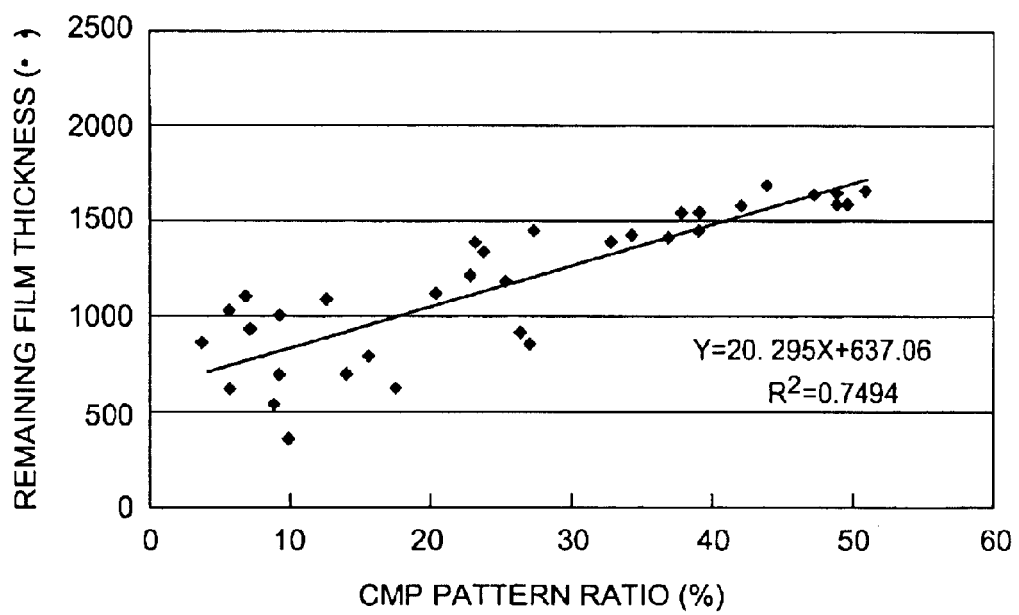
FIG. 7 illustrates the validity of the first method for estimating remaining film thickness in accordance with the present invention.

1-2. Assessing the Validity of the First Method for Estimating the Thickness Distribution of Remaining Film FIG. 7 illustrates a relationship between the CMP pattern ratio distribution in a one-chip mask region explained in 1-1 above and the thickness of film remaining from the CMP in active regions formed by a patterning mask by which the CMP pattern ratio distribution has been obtained. In the diagram, the axis of abscissa indicates CMP pattern ratio X (%), while the axis of ordinate indicates remaining film thickness Y (Å).

Referring to FIG. 7, the relationship between the CMP pattern ratio and the thickness of remaining film may be approximately linear (correlation coefficient: 0.7494). A relatively good correlation has been obtained.

Using an approximate line (line approximate expression: Y=20.295X+637.06) makes it possible to estimate the remaining film thickness (Å) at a particular CMP pattern ratio.

2-1. Second Method for Estimating the Distribution of Remaining Film Thickness

Referring to FIG. 8 through FIG. 11, a second method for estimating the distribution of remaining film thickness in accordance with the present invention. This method for estimating the distribution of remaining film thickness in accordance with the present invention is also implemented by using a computer. The following description will be also given of one-chip mask regions.

Figure 8:
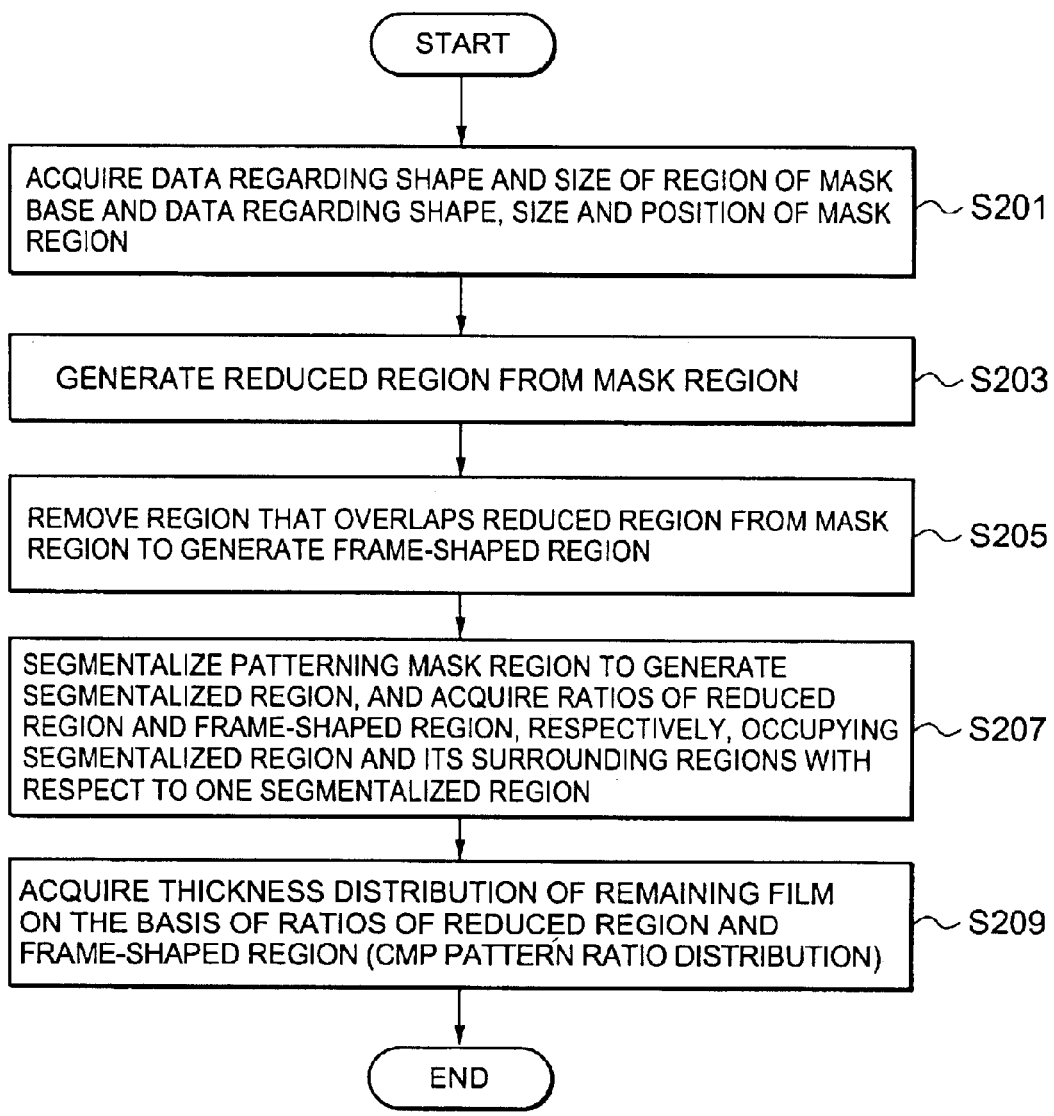
FIG. 8 is a flowchart illustrating a second method for estimating remaining film thickness in accordance with the present invention.

In this configuration example, attention will be focused on the difference in polishing characteristic in the CMP step between a case where the insulating film 26 has been formed on the entire surface of an active region 22 and a case where the insulating film 26 remains on a part of the region on an active region 22 because of the insulating film removing step is carried out. The second method for estimating the thickness distribution of remaining film (CMP pattern ratio) will be explained in detail. According to the second method, on the basis of the layouts of a patterning mask and a reversing mask, the relative differences in film thickness of remaining film among active regions after the CMP step are estimated. FIG. 8 is a flowchart schematically illustrating the second method for estimating the thickness distribution of remaining film in accordance with the present invention.

First, as shown in FIG. 8, data regarding the shape and size of a region of a mask base and data regarding the shape, size and position of a mask pattern for forming an activation region that has been designed in the mask base are acquired in step S201. These pieces of data can be read from a data file created by, for example, patterning mask designing software (GDS2), as in the case of the first method for estimating the thickness distribution of remaining film.

In other words, in this configuration example also, a patterning mask that has a mask pattern that is associated with activation regions and used for forming an assessment TEG chip having active regions distinguished by the hatching densities shown in FIG. 3 is designed, as described in conjunction with step S101 in the first method for estimating the distribution of remaining film.

Subsequently, in step S203, a reduced region is generated by removing a predetermined width from the mask pattern along the edge of the mask pattern.

In this configuration example, however, as the reduced region, a region corresponding to the region of the surface protection film 14 exposed on the active regions 22 in the insulating film removing step previously described is produced.

Accordingly, as shown in FIG. 9A, a reduced region 16b in this configuration example is created by first cutting the mask pattern by 1.2 $\mu$m inward along the edge of the mask pattern, then expanding outward by 0.4 $\mu$m. Alternatively, the reduced region 16b may be produced simply by removing the area of a desired width rather than carrying out the aforesaid deletion and expansion.

In step S205, the regional area overlapping the reduced region 16b corresponding to the mask pattern 16 is removed from the mask pattern to form a frame-shaped region. The frame-shaped region exactly matches the area of the width that has been removed.

In this configuration example, as shown in FIG. 9B, the region corresponding to the one formed by the insulating film 26 remaining on the active region 22 in the aforesaid insulating film removing step is produced as the frame-shaped region 16c.

In step S207, the region of the patterning mask is segmentalized to generate a plurality of segmentalized regions of the same shape and size in the same manner as that in step S105 discussed above.

The thickness of remaining film after the CMP is influenced by the densities of peripheral active regions, as previously described in the first method for estimating the thickness distribution of remaining film. For this reason, the peripheral regions of one unit of segmentalized regions are taken into account also in this configuration example.

Accordingly, in this configuration example also, on all units in a one-chip mask region, the area ratio of the reduced region 16b and the area ratio of the frame-shaped region 16c are separately determined according to the same method as that in step S105 of the first method for estimating the thickness distribution of remaining film. The area ratio of the frame-shaped region 16c can be acquired according to the same method used for acquiring the area ratio of the reduced region 16b.

Figure 10A:
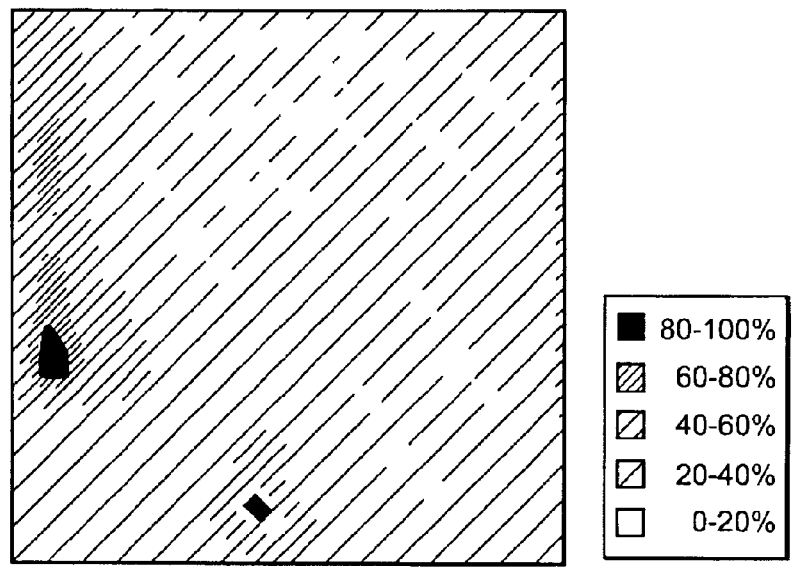
FIG. 10 illustrates the second method for estimating remaining film thickness in accordance with the present invention.
Figure 10B:
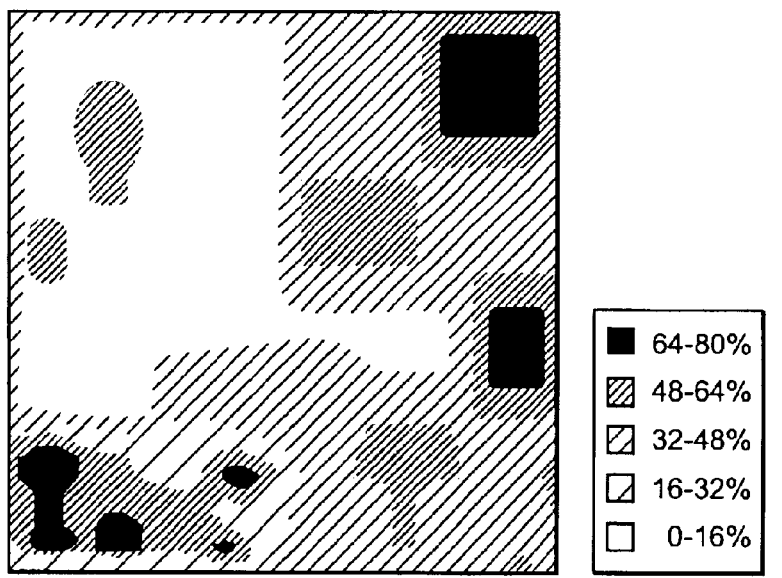

Thus, a precursor CMP pattern ratio distribution (%) obtained from the area ratio of the reduced region, as shown in FIG. 10A, and a precursor CMP pattern ratio distribution (%) obtained from the area ratio of the frame-shaped region, as shown in FIG. 10B are acquired.

In step S209, based on the area ratios of the reduced region and the frame-shaped region acquired in step S207, the remaining film thickness distribution, which is referred to also as the CMP pattern ratio distribution, in percent (%) that makes it possible to estimate the thickness distribution of remaining film after the CMP is acquired.

To combine the area ratios of the reduced region and the frame-shaped region determined in step S207 to calculate the CMP pattern ratio by an expression of, for example. (Area ratio of the reduced region)×0.25+(Area ratio of the frame-shaped region). This means that the CMP pattern ratio distribution in this configuration example is designed to heavily depend on the area ratio of the frame-shaped region 16c obtained in step S207.

Figure 11:
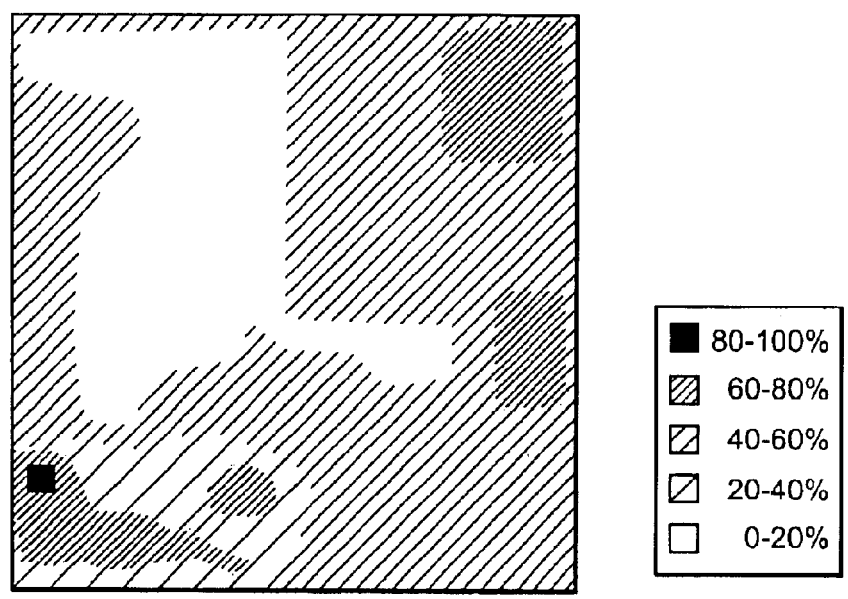
FIG. 11 illustrates the second method for estimating remaining film thickness in accordance with the present invention.

By carrying out the series of steps discussed above, it is possible to obtain the CMP pattern ratio distribution defined by the hatching density, as shown in FIG. 11. In the diagram, a region with denser hatching indicates a region with a higher CMP pattern ratio, meaning that the remaining film is thicker (refer to the densities in percent (%) at right in FIG. 11).

Thus, the relative differences in thickness of remaining film among active regions following the CMP step can be estimated from the CMP pattern ratio distribution obtained on the basis of the layout of a patterning mask.

Figure 12:
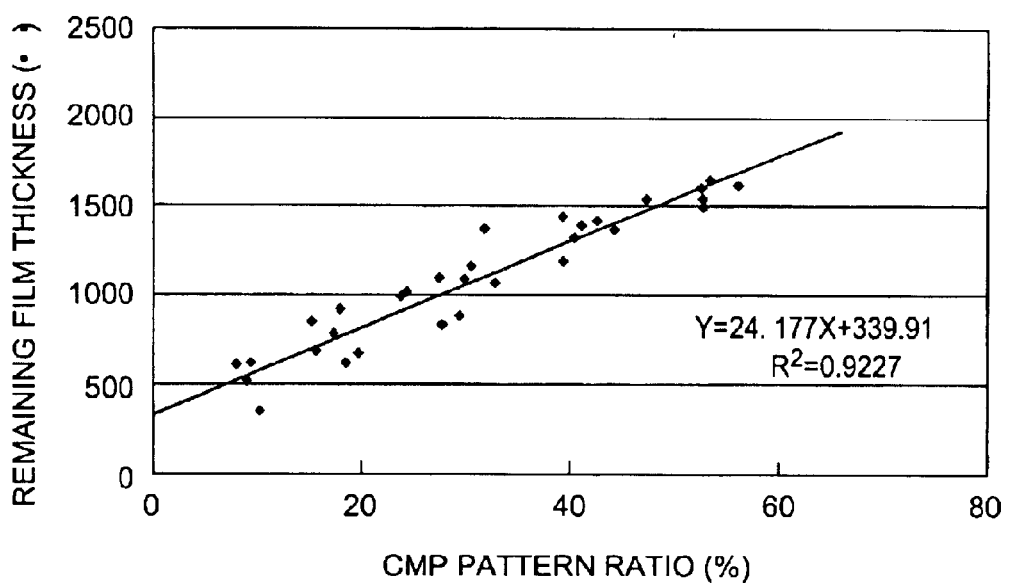
FIG. 12 illustrates the validity of the second method for estimating remaining film thickness in accordance with the present invention.

2-2. Assessing the Validity of the Second Method for Estimating the Thickness Distribution of Remaining Film FIG. 12 illustrates a relationship between the CMP pattern ratio distribution explained in 2-1 above and the thickness of film remaining from the CMP in active regions formed by a patterning mask by which the CMP pattern ratio distribution has been obtained. In the diagram, the axis of abscissa indicates CMP pattern ratio X (%), while the axis of ordinate indicates remaining film thickness Y (Å).

Referring to FIG. 12, the relationship between the CMP pattern ratio and the thickness of remaining film may be approximately linear (correlation coefficient: 0.9227). A better correlation than that in 1-2 above has been obtained.

Using an approximate line (line approximate expression: $Y=24.177X+339.91$) makes it possible to estimate the remaining film thickness (Å) at a particular CMP pattern ratio with higher accuracy.

3. Patterning Mask Design Method Based on the Thickness Distribution of Remaining Film (CMP Pattern Ratio Distribution)

3-1. First Patterning Mask Design Method

Figure 13:
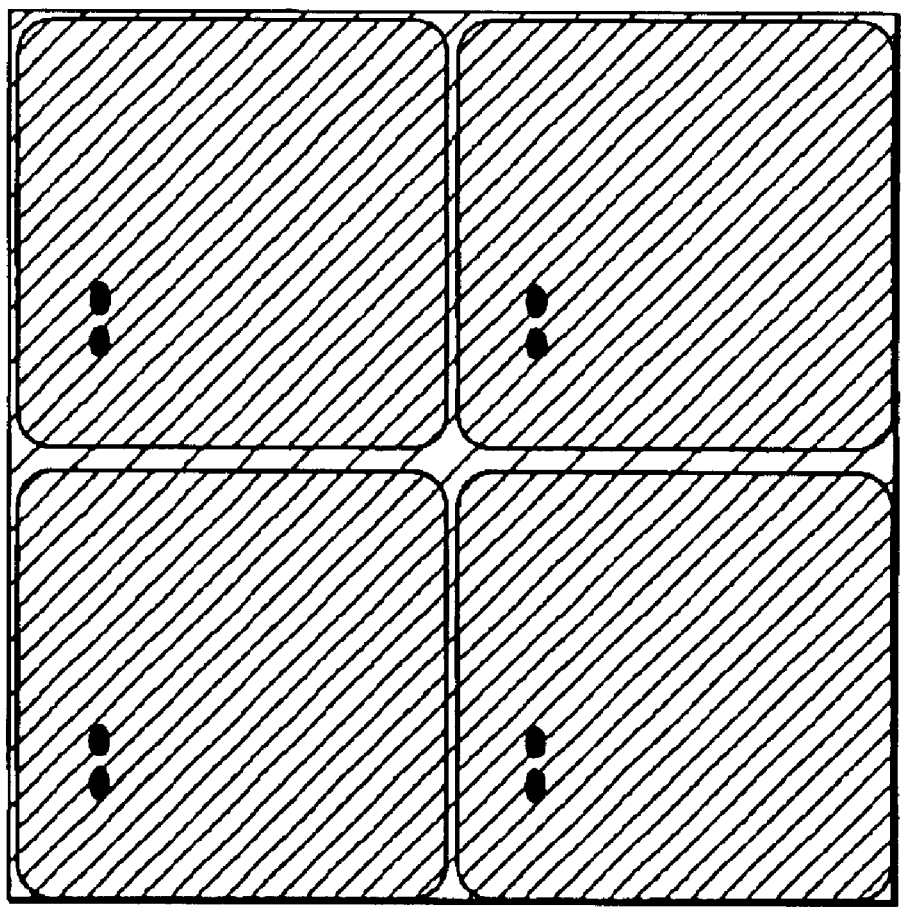
FIG. 13 illustrates a first method for designing a patterning mask in accordance with the present invention.
Figure 14:
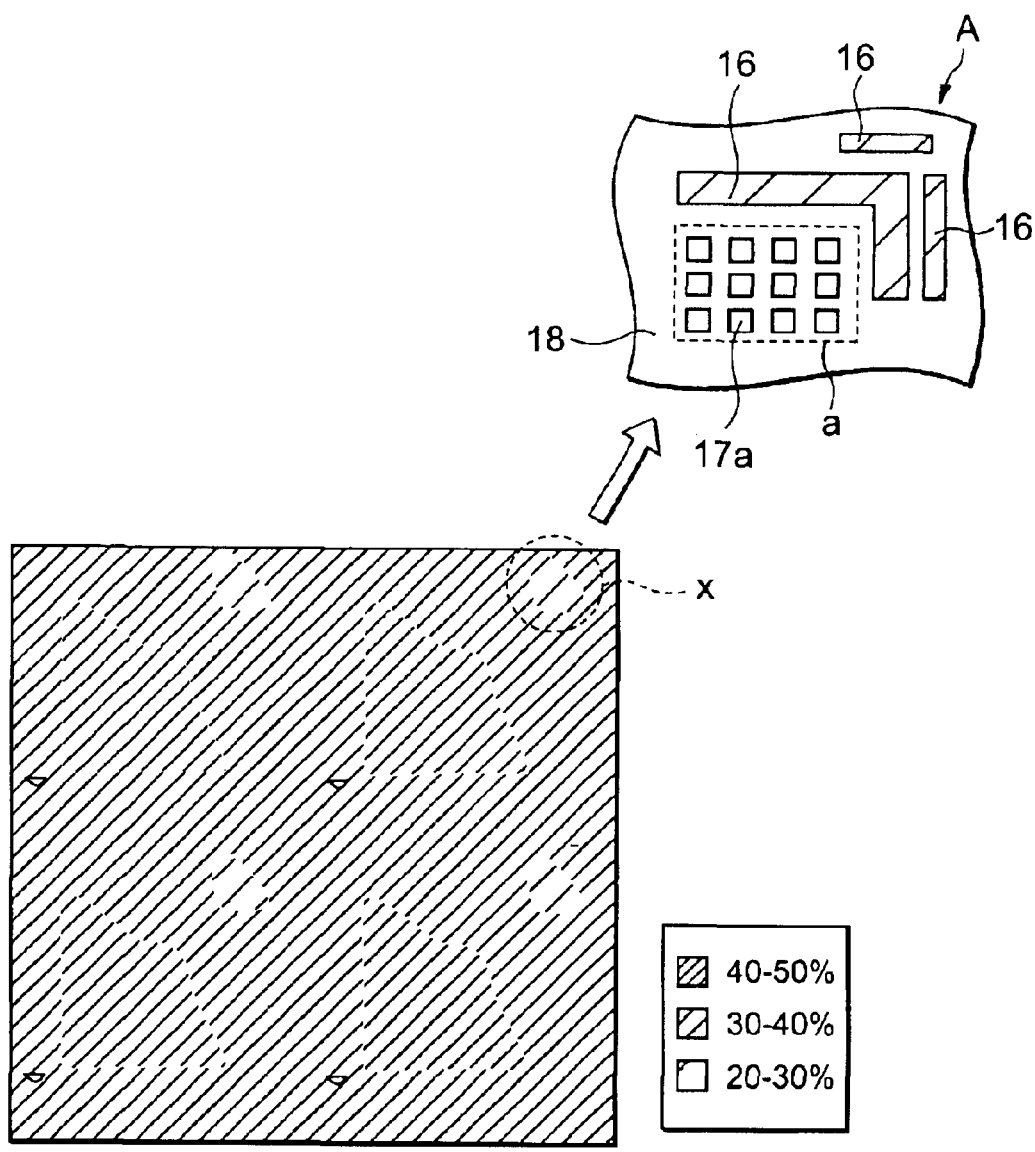
FIG. 14 illustrates the first method for designing a patterning mask in accordance with the present invention.

Referring now to FIGS. 13 and 14, a first patterning mask design method in accordance with the present invention will be explained.

Based on the CMP pattern ratio distributions obtained by the aforesaid first and second methods for estimating the distribution of remaining film, it is possible to predict global differences that occur in an actual CMP step.

In this configuration example, a description will be given of a design method for patterning masks that makes use of CMP pattern ratio distribution to permit reduced global differences taking place in the CMP step. This design method for patterning masks in accordance with the present invention also uses a computer.

FIG. 13 shows the CMP pattern ratio distribution obtained from a one-chip mask region having mask patterns for forming an assessment TEG chip that has active regions distinguished by hatching density. The CMP pattern ratio distribution in this case is acquired by the second method for estimating the thickness distribution of remaining film explained in 2-1 above.

First of all, based on the CMP pattern ratio distribution, a first region in a one-chip mask region is extracted. The first region corresponds to a region predicted to have a high polishing rate, that is, a region predicted to have a relatively thin remaining film or a relatively low CMP pattern ratio.

More specifically, referring also to FIG. 14, a first region A in the one-chip mask region that corresponds to a region X having a low CMP pattern ratio in the CMP pattern ratio distribution is extracted.

Then, in the first region A within the one-chip mask region, a first pseudo region 17a for forming a first pseudo or dummy activation region or active region on a corresponding semiconductor substrate is set in a region "a" outside the mask pattern 16 corresponding to the activation region.

More specifically, in the region "a" within the one-chip mask region, first pseudo regions (1 µm long×1 µm wide in this case) 17a for forming the dummy active regions on the semiconductor substrate are set such that they are arranged as shown in FIG. 14 with 1.5-µm intervals.

Thus, the first region A in which the first pseudo regions 17a have been set increases the density of the active region including the dummy active regions formed on the semiconductor substrate.

As a result, the polishing rate drops in the first region A, so that the remaining film thickness after the CMP increases, meaning that the CMP pattern ratio in the region X increases. This allows the global flatness of the entire chip surface to be improved.

As is obvious from the above explanation, according to the method for designing a patterning mask, a first pseudo region is locally designed into a patterning mask on the basis of the degree of a global difference predicted from CMP pattern ratio distribution. This makes it possible to restrain the occurrence of global differences more efficiently, as compared with prior arts.

3-2. Second Patterning Mask Design Method

Figure 15:
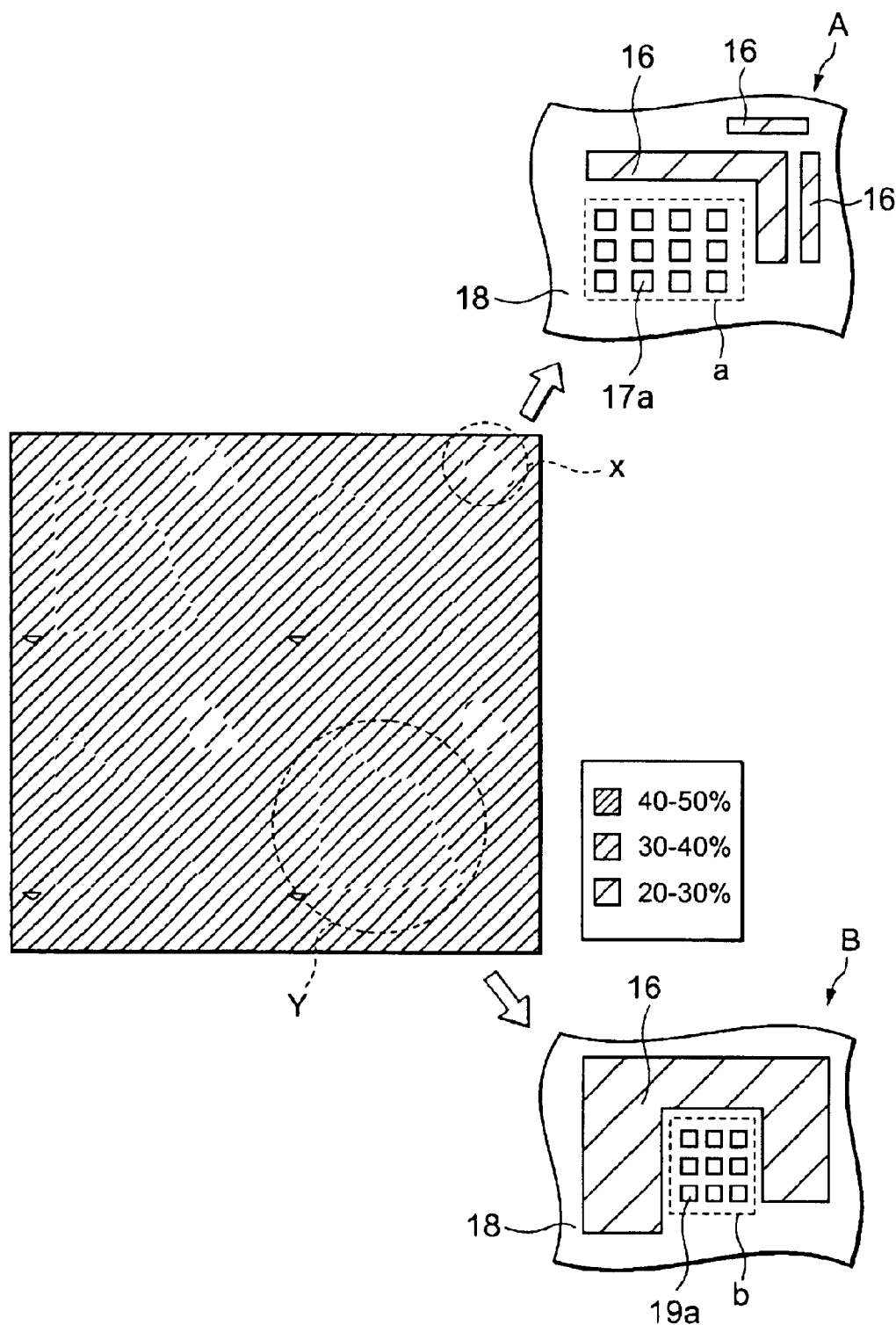
FIG. 15 illustrates a second method for designing a patterning mask in accordance with the present invention.

Referring now to FIG. 15, a second method for designing a patterning mask in accordance with the present invention will be explained.

The configuration example according to the second patterning mask design method differs from the one according to the first patterning mask design method primarily in that a second pseudo region that substantially prevents an increase in CMP pattern ratio is set in a region of a one-chip mask region that corresponds to a region with a high CMP pattern ratio.

The configuration according to the first patterning mask design method has the first pseudo region 17*a* set in the region (the first region A) of one-chip mask region that corresponds to the region having a relatively low CMP pattern ratio in the CMP pattern ratio distribution.

However, if the ratio at which the first pseudo region 17*a* is set varies according to the layout of a mask patterns in a one-chip mask region, then the area ratio of the sum of the mask pattern 16 and the first pseudo region 17*a* occupying the one-chip mask region also varies.

As a result, before a semiconductor substrate is etched for forming active regions by using a patterning mask, the etching conditions must be set for each one-chip mask region, inevitably complicating the etching process.

To solve the inconvenience mentioned above, according to the second design method, a second region is extracted from a one-chip mask region. Based on CMP pattern ratio distribution, a region predicted to have a low polishing rate, that is, a region predicted to have relatively thick remaining film or a region predicted to have a relatively high CMP pattern ratio is extracted as the second region.

More specifically, as shown in FIG. 15, a second region B in the one-chip mask region is extracted, the second region B corresponding to a region Y exhibiting a high CMP pattern ratio in the CMP pattern ratio distribution.

Subsequently, second pseudo regions 19*a* for forming dummy active regions on an associated semiconductor substrate are set in a region "b" outside a mask pattern 16 of the second region B, This is to make the ratio of the total area of the mask patterns and the pseudo regions occupying each one-chip mask region substantially constant.

More specifically, in the region "b" within the one-chip mask region, small second pseudo regions (0.3 $\mu$m long×0.3 $\mu$m wide in this case) 19*a* for forming the dummy active regions on the semiconductor substrate are set such that they are arranged as shown in FIG. 15 with, for example, 1.5-$\mu$m intervals.

Thus, the ratio of the total area of the mask patterns 16 and the pseudo regions (the first and second pseudo regions 17*a* and 19*a*) occupying each one-chip mask region remains substantially constant.

The small second pseudo regions 19*a* prevent an insulating film from being thickly deposited on active regions formed on the semiconductor substrate, substantially causing no increase in the CMP pattern ratio in the region Y. The second pseudo regions 19*a* are ideally formed to have a square shape of 0.3 $\mu$m or less long and 0.3 $\mu$m or less wide. This will substantially prevent the CMP pattern ratio from increasing.

As is obvious from the above description, the method for designing patterning masks in accordance with this embodiment makes it possible to provide an advantage similar to that obtained by the first patterning mask design method.

Moreover, according to the configuration example, control can be conducted so as to maintain the ratio of the total area of the mask patterns and the pseudo regions (the first and second pseudo regions) occupying each one-chip mask region. This allows complication of etching process to be reduced.

3-3. Third Patterning Mask Designing Method

Figure 16:
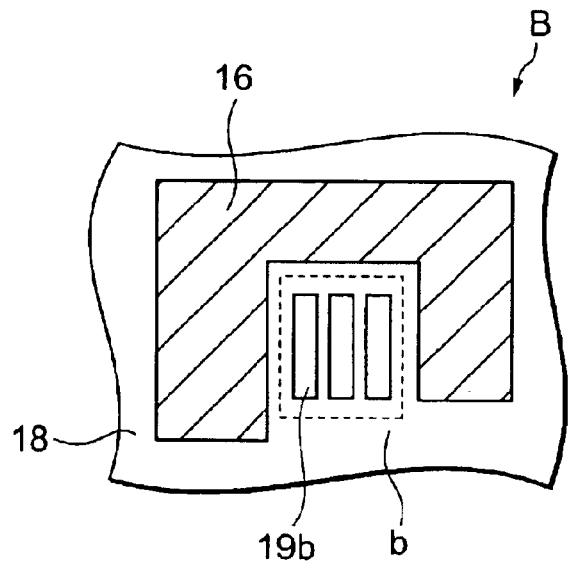
FIG. 16 illustrates a third method for designing a patterning mask in accordance with the present invention.

Referring now to FIG. 16, a third patterning mask design method in accordance with the present invention will be explained.

The configuration example according to the third method differs from the second patterning mask design method primarily in that the second pseudo regions have an elongate shape.

According to the second patterning mask design method, a plurality of the second pseudo regions 19*a* having the square shape of 0.3 $\mu$m long and 0.3 $\mu$m wide are set in the one-chip mask region that corresponds to a region with a relatively high CMP pattern ratio in the CMP pattern ratio distribution.

However, setting the plurality of the small second pseudo regions 19*a* is undesirable because it leads to a markedly increased capacity of a data file created using patterning mask design software (e.g., GDS2).

Accordingly, in this configuration example, the second pseudo regions are formed in an elongate regions 19*b* having their short sides set to 0.3 $\mu$m.

However, an insulating film having substantially the same film thickness as that in the second pseudo regions 19*a* will be deposited on the dummy active regions formed on a semiconductor substrate by the second pseudo regions 19*b*. This is because the thickness of the insulating film depends on the length or width of a short side of the dummy active regions.

Thus, the length of the short sides of the second pseudo regions 19*b* in this configuration example is set to substantially the same width as the length of the short sides of the second pseudo regions 19*a* in the second patterning mask design method, substantially causing no increase in the CMP pattern ratio.

In addition, the configuration example permits a reduction in the number of patterns of the second pseudo regions, so that the capacity of a data file created using design software can be reduced, as compared with the second patterning mask design method.

As is obvious from the above description, according to the patterning mask design method according to this embodiment, the advantage similar to that provided by the second patterning mask design method can be obtained.

Moreover, the number of the patterns of the second pseudo regions can be reduced, making it possible to achieve a data file capacity that is easy to handle in practical use.

3-4. Fourth Patterning Mask Design Method

Figure 17:
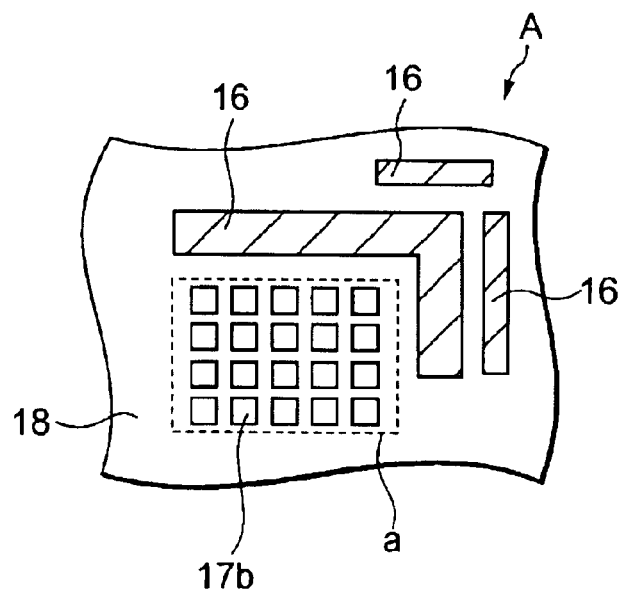
FIG. 17 illustrates a fourth method for designing a patterning mask in accordance with the present invention.

Referring to FIG. 17, a description will now be given of a fourth patterning mask design method in accordance with the present invention.

A configuration example according to the fourth method differs from that in the first patterning mask design method primarily in that the area ratio of the first pseudo regions occupying a region "a" has been increased.

More specifically, in the region "a" within a one-chip mask region, first pseudo regions (1 $\mu$m long×1 $\mu$m wide in this case) 17*b* for forming the dummy active regions on the semiconductor substrate are set such that they are arranged as shown in FIG. 17 with, for example, 1.3-$\mu$m intervals.

Thus, the ratio of the first pseudo regions occupying the region "a" increases to be larger than that in the first patterning mask design method, allowing the polishing rate in a first region A to be further lowered.

As a result, the remaining film thickness after the CMP in the first region A further increases. i.e., the CMP pattern ratio in a region X further increases. This permits the global flatness of an entire chip surface to be further improved.

As is obvious from the above description, the patterning mask design method according to this embodiment makes it possible to restrain the occurrence of global differences even more than the first patterning mask design method.

3-5. Fifth Patterning Mask Design Method

Figure 18:
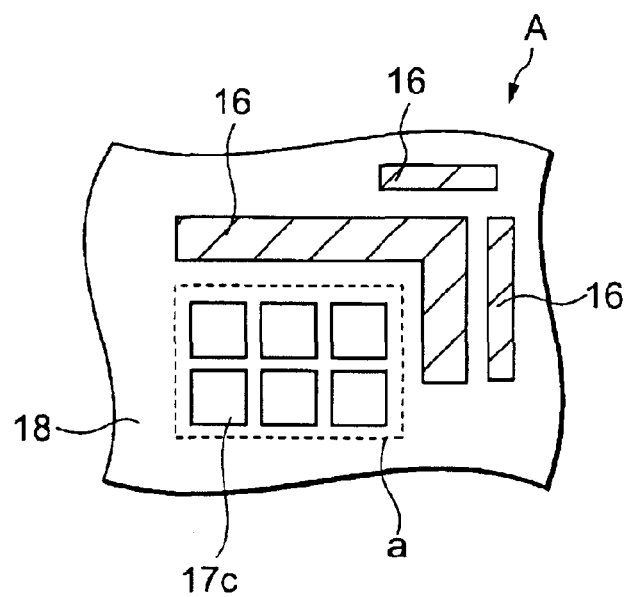
FIG. 18 illustrates a fifth method for designing a patterning mask in accordance with the present invention.

Referring to FIG. 18, a fifth patterning mask design method in accordance with the present invention will be explained.

A configuration example according to the fifth method differs from that in the fourth patterning mask design method primarily in that the ratio of the first pseudo regions occupying a region "a" has been increased by increasing the sizes of the first pseudo regions.

More specifically, in a region "a" within a one-chip mask region, first pseudo regions (1.3 μm long×1.3 μm wide in this case) 17c for forming the dummy active regions on the semiconductor substrate are set such that they are arranged as shown in FIG. 18 with 1.5-μm intervals.

Thus, as in the case of the fourth patterning mask design method, the remaining film thickness after the CMP in the first region A increases, i.e., the CMP pattern ratio in a region X further increases. This allows the global flatness of an entire chip surface to be further improved.

Moreover, in this configuration example, the increased sizes of the first pseudo regions cause the remaining film to be thicker than in the fourth patterning mask design method.

As is obvious from the above description, the patterning mask design method according to this embodiment makes it possible to restrain the occurrence of global differences even more than the fourth patterning mask design method.

3-6. Sixth Patterning Mask Design Method

Figure 19:
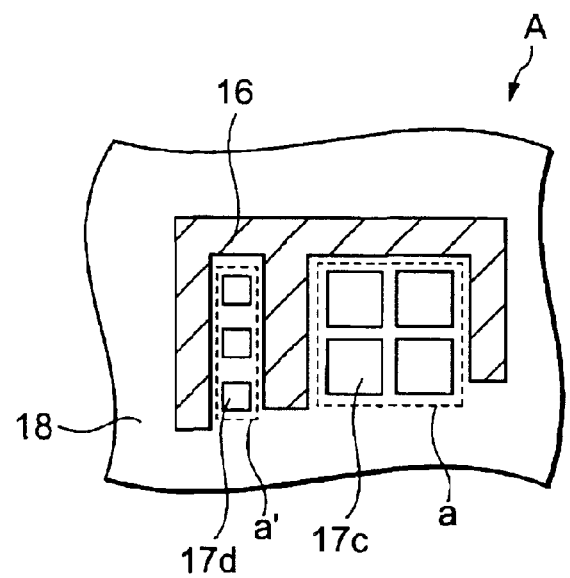
FIG. 19 illustrates a sixth method for designing a patterning mask in accordance with the present invention.

Referring to FIG. 19, a sixth patterning mask design method in accordance with the present invention will be explained.

A configuration example according to the sixth method differs from that in the fifth patterning mask design method primarily in that the sizes of the first pseudo regions are set on the basis of the size of a region "a."

As it has been explained in conjunction with the fifth patterning mask design method, when the sizes of the first pseudo regions are increased, it is difficult to set first pseudo regions 17c in all regions "a."

Hence, in a configuration example according to the sixth patterning mask design method, first pseudo regions (1.5 μm long×1.5 μm wide) 17c similar to those described in conjunction with the fifth patterning mask design method with 1.3-μm intervals are set first in a region "a" that is capable of accommodating them. Then, smaller first pseudo regions (1 μm long×1 μm wide in this case) 17d than the first pseudo regions 17c are set with 1.5-μm intervals in a region a' wherein it is difficult to set the first pseudo regions 17c.

Thus, the ratio of the first pseudo regions occupying the region "a" increases to be larger than that in the fifth patterning mask designing method, allowing the polishing rate in a first region A to be further lowered.

As a result, the remaining film thickness after the CMP in the first region A further increases, i.e., the CMP pattern ratio in a region X further increases. This permits the global flatness of an entire chip surface to be further improved.

As is obvious from the above description, the patterning mask design method according to this embodiment makes it possible to restrain the occurrence of global differences even more than the fifth patterning mask design method.

3-7. Seventh Patterning Mask Design Method

Referring now to FIG. 20, a seventh patterning mask design method in accordance with the present invention will be explained.

According to a configuration example based on the seventh method, if a plurality of first regions A are extracted, then the ratio of first pseudo regions occupying an area outside a mask pattern (region a') in the first region A is increased according to the estimated degree of remaining film becoming thinner in each of the first regions A.

More specifically, first pseudo regions 17c and 17d are set according to the procedure indicated in the sixth patterning mask design method in the first region A in a patterning mask corresponding to a region wherein the remaining film is predicted to be relatively thinner from CMP pattern ratio distribution.

However, for a first region A' in the patterning mask corresponding to the region wherein the remaining film is predicted to be extremely thin, first pseudo regions 17c are set with 1.3-μm intervals first in a region "a." Then, for a region a' wherein it is difficult to set the first pseudo regions 17c, smaller first pseudo regions 17d than the first pseudo regions 17c are set with 1.3-μm intervals.

In other words, the ratio of first pseudo regions occupying the first region can be duly adjusted according to the degree of remaining film thickness for the first region.

As is obvious from the above explanation, the patterning mask design method according to the embodiment makes it possible to efficiently restrain global differences from taking place by adjusting the setting of the first pseudo regions on the basis of the degree of remaining film thickness estimated from CMP pattern ratio distribution.

4. Manufacturing Method for Semiconductor Devices by Using Patterning Masks Designed Utilizing the Method for Estimating Remaining Film Thickness Distribution An STI-CMP process is carried out as in the past, which includes the steps of etching semiconductor substrates with surface protection films by using the patterning masks fabricated according to the first through seventh patterning mask design methods to obtain remaining activation regions and etched device isolation trenches.

As a result, semiconductor devices having less global differences with resultant better global flatness can be obtained.

The present invention is not limited to the combinations of the embodiments described above. The invention can be applied to combinations of preferred conditions in arbitrary preferred stages.

As is obvious from the above explanation, the method for estimating remaining film thickness distribution in accordance with the present invention makes it possible to estimate relative remaining film thickness distribution (CMP pattern ratio distribution) among sparse and dense active regions after CMP on the basis of the mask pattern layout of a patterning mask.

Thus, the use of the CMP pattern ratio distribution makes it possible to design patterning masks that permit reduced global differences taking place in a CMP process, allowing semiconductor devices with good global flatness to be obtained.

What is claimed is:

1. A method for estimating remaining film thickness distribution of a surface protection film that remains on each activation region after chemical mechanical polishing when a semiconductor substrate having the surface protection film is etched using a patterning mask that has a mask pattern for producing an activation region to form a device isolation trench so as to create the activation region, an insulating film is provided over the activation region to fill the device isolation trench, and chemical mechanical polishing is performed on the semiconductor substrate with the insulating film provided thereon to form a device separating portion, the patterning mask comprising a plurality of one-chip mask regions arranged in matrix, and each of the one-chip mask regions comprising a same number of the mask patterns in a same layout, the method for estimating remaining film thickness distribution comprising:

generating a reduced region on each of the mask patterns by removing a predetermined width from the mask pattern along an edge of the mask pattern;

segmentalizing the one-chip mask region into predetermined segmentalized regions to generate segmentalized regions and to acquire an area ratio of all reduced regions with respect to each of the segmentalized regions, all of the reduced regions occupying a region that includes the segmentalized region at a fixed position and has a same size and shape as those of the one-chip mask region; and acquiring the remaining film thickness distribution in the one-chip mask region based on the area ratio.

2. The method for estimating remaning film thickness distribution according to claim 1, wherein the reduced region is generated so as to have substantially a same size and shape as those of a top surface region of the insulating film that covers the activation region corresponding to the reduced region.

3. A method for estimating remaining film thickness distribution of a surface protection film that remains on each activation region after chemical mechanical polishing when a semiconductor substrate having the surface protection film is etched using a patterning mask that has a mask pattern for forming an activation region to form a device isolation trench so as to create the activation region, an insulating film is provided over the activation region to fill the device isolation trench, and chemical mechanical polishing is performed on the semiconductor substrate with the insulating film provided thereon to form a device separating portion, the patterning mask comprising a plurality of one-chip mask regions arranged in matrix, and each of the one-chip mask regions comprising a same number of the mask patterns in a same layout, the method for estimating remaining film thickness distribution comprising:

generating a reduced region for each of the mask patterns by removing a predetermined width from each mask pattern along an edge of the mask pattern;

generating a frame-shaped region by removing, from the mask pattern, a regional portion that overlaps the reduced region corresponding to the mask pattern;

segmentalizing the one-chip mask region into predetermined segmentalized regions to generate segmentalized region and to acquire an area ratio of all reduced regions and frame-shaped regions, respectively, with respect to each of the segmentalized regions, the reduced regions and the frame-shaped regions occupying a region that includes the segmentalized region at a fixed position and has a same size and shape as those of the one-chip mask region in each of the segmentalized regions; and acquiring the remaining film thickness distribution in the one-chip mask region based on the area ratio of the reduced regions and the area ratio of the frame-shaped regions.

4. A patterning mask design method for designing a patterning mask using the method for estimating remaining film thickness distribution according to any one of claims 1 to 3, comprising:

extracting a first region predicted to have a high polishing rate in the one-chip mask region; and setting a first pseudo mask pattern for forming a first pseudo activation region outside the mask pattern in the first region.

5. The patterning mask design method according to claim 4, further comprising:

extracting a second region predicted to have a low polishing rate in the one-chip mask region; and designing a second pseudo mask pattern for forming a second pseudo activation region outside the mask pattern in the second region, wherein a ratio of area of the mask pattern and the regions in which the first and second pseudo mask patterns are formed that occupies each one-chip mask region is substantially fixed.

6. The patterning mask design method according to claim 5, wherein an elongate region is set as the second pseudo mask pattern in said designing a second pseudo mask pattern.

7. The patterning mask design method according to any one of claims 5 and 6, wherein a space size of the first pseudo mask pattern is set according to a space size of a region outside the mask pattern of the first region.

8. The patterning mask design method according to any one of claims 5 and 6, wherein an area ratio of the first pseudo mask pattern occupying a region outside the mask pattern in the first region is increased according to a predicted level of polishing rate in a plurality of first regions in said setting the first pseudo mask pattern.

9. A manufacturing method for a semiconductor device using the patterning mask according to any one of claims 5 and 6, comprising:

etching the semiconductor substrate having the surface protection film using the patterning mask so as to form a remaining activation region and a device isolation trench produced by said etching.

* * * * *